Dec. 3, 1940.　　　　S. C. WINGER　　　　2,223,711
VARIABLE SPEED MECHANISM
Original Filed Dec. 10, 1935　　4 Sheets-Sheet 1

INVENTOR
Stover C. Winger
BY John Flam
ATTORNEY

Dec. 3, 1940.  S. C. WINGER  2,223,711
VARIABLE SPEED MECHANISM
Original Filed Dec. 10, 1935    4 Sheets-Sheet 2

INVENTOR
Stoyer C. Winger
BY John Flam
ATTORNEY

Dec. 3, 1940.  S. C. WINGER  2,223,711
VARIABLE SPEED MECHANISM
Original Filed Dec. 10, 1935  4 Sheets-Sheet 3

INVENTOR
Stover C. Winger
BY John Flam
ATTORNEY

Dec. 3, 1940.  S. C. WINGER  2,223,711
VARIABLE SPEED MECHANISM
Original Filed Dec. 10, 1935  4 Sheets-Sheet 4

INVENTOR
Stoyer C. Winger
BY John Flam
ATTORNEY

Patented Dec. 3, 1940

2,223,711

UNITED STATES PATENT OFFICE 2,223,711

VARIABLE SPEED MECHANISM

Stover C. Winger, Los Angeles, Calif., assignor to Guy H. Hall, Los Angeles, Calif.

Application December 10, 1935, Serial No. 53,806
Renewed April 6, 1940

21 Claims. (Cl. 74—115)

This invention relates to a device for transmitting motion or power from one element to another. More particularly, it relates to a device that can be adjusted for varying speed ratios, through a continuous range.

It has been proposed in the past to utilize for this purpose, a planetary drive, in which one wheel is stationary and the other is arranged to roll on the periphery of the fixed wheel, the effective diameter of at least one of the wheels being variable. In this way the rate of angular motion of the planetary wheel about its own axis is made variable also.

It is one of the objects of this invention to improve in general on planetary drives of this character.

In particular, a device constructed in accordance with the present invention is so arranged that the driving contact between the members is on the side surfaces thereof instead of the periphery. The surfaces are urged together in such manner that the contact areas in driving relationship are limited selectively in succession to the area at and neighboring the common tangent to the circles corresponding to the effective diameters of the two wheels in planetary driving relation.

By limiting this area of contact not only to this locality but also to the side surfaces of the members, it is seen that it is possible to enlarge the effective diameter of the circle corresponding to the planetary wheel, even beyond the diameter of the stationary wheel, and even when the planetary action can be described as taking place on the concave side of the circle corresponding to the stationary wheel.

It is accordingly another object of this invention to make it possible to secure these results, and especially by the aid of simple and inexpensive apparatus.

In particular, the elements required to accomplish the desired effects include one-way drives such as pawl or ratchet drives; but for practical use, rolling wedge elements are utilized. These rolling wedges may be in the form of balls or rollers. They are preferably arranged in an annular band around the center of one or the other of the wheels, and are quite closely spaced in an angular direction. The wedging spaces are so arranged that the direction of drive can be made selective to determine the direction of rotation of the driven shaft. Thus a change in the wedging direction determines at which of two diametrically opposite points a driving contact can be established; these two points progressing in succession in accordance with the angular progression of the planetary wheel. It will be seen later on, that these points lie on the extremities of a diameter drawn through the two axes of the two wheels.

It is accordingly still another object of this invention to provide this type of unidirectional drive between wheels corresponding to a planetary drive.

One advantageous effect of a drive of this construction is that it provides a "free wheeling" effect similar to that used for automobile drives by an overrunning clutch device. It is therefore still another object of this invention to secure this effect in a compact mechanism capable of being used as either a clutch or speed change device for vehicles. Since the change in speed is a continuous function of the change in effective relative diameters of the wheels, the change speed is smooth in operation.

It is still another object of the invention to provide a simple and improved control means for the speed change, involving a mechanism for varying the spacing between the axes of the two wheels, and for compensating for the unbalance due to the eccentric motion of the planetary wheel.

Since the planetary wheel is caused to rotate at varying speeds about its own axis to secure the desired speed variation, it is necessary to provide a universal drive from the axis of the planetary wheel to the drive shaft. It is another object of this invention to provide an improved power connection of this character.

This invention possesses many other advantages, and has other objects which may be made more easily apparent from a consideration of one embodiment of the invention. For this purpose there is shown a form in the drawings accompanying and forming part of the present specification. This form shall now be described in detail, illustrating the general principles of the invention; but it is to be understood that this detailed description is not to be taken in a limiting sense, since the scope of the invention is best defined by the appended claims.

Referring to the drawings:

Figs. 12, 12a, 13, and 13a are diagrams illustrating the mode of operation of the transmission under various operating conditions.

In the present instance the member which forms the equivalent of a planetary or rolling wheel is provided by a flat disc or plate 16. This disc 16 is splined to a shaft 39. In the positions shown in Figs. 1 and 2 the eccentricity of shaft 39 with respect to a driving shaft 1 is zero; but as will be described hereinafter, this eccentricity can be increased to a definite value so that the spacing of the axes of shaft 39 and of shaft 1 can be adjusted.

It is sufficient for the present to note that shaft 39 is guided for angular motion about its own axis partly by the aid of an extension 40 and a stub shaft 41, over which extension the right hand end of shaft 39 is journalled. For this purpose the right hand end of shaft 39 has a recess or aperture 100.

The equivalent of a stationary wheel upon which the planetary rolling is produced by the motion of disc 16, is formed by a pair of stationary structures. Each structure includes a stationary plate 17, and elements such as 27, which serve to clutch the disc or plate 16 to the stationary members 17 at a restricted area, said area successively changing in position whereby the rolling planetary effect is secured. In the present instance these clutching members are represented by rolling elements 27 in the form of balls. The arrangement is such that these balls wedge between the stationary members 17 and the intermediate disc 16 for one direction of relative motion, and are freed from wedging action for the opposite direction of motion. It is also apparent therefore that there is obtained a rolling action by the aid of areas in contact between the balls 27 and the disc 16, in which the areas of contact lie in a plane substantially perpendicular to the axis of the member 16.

Figure 2:
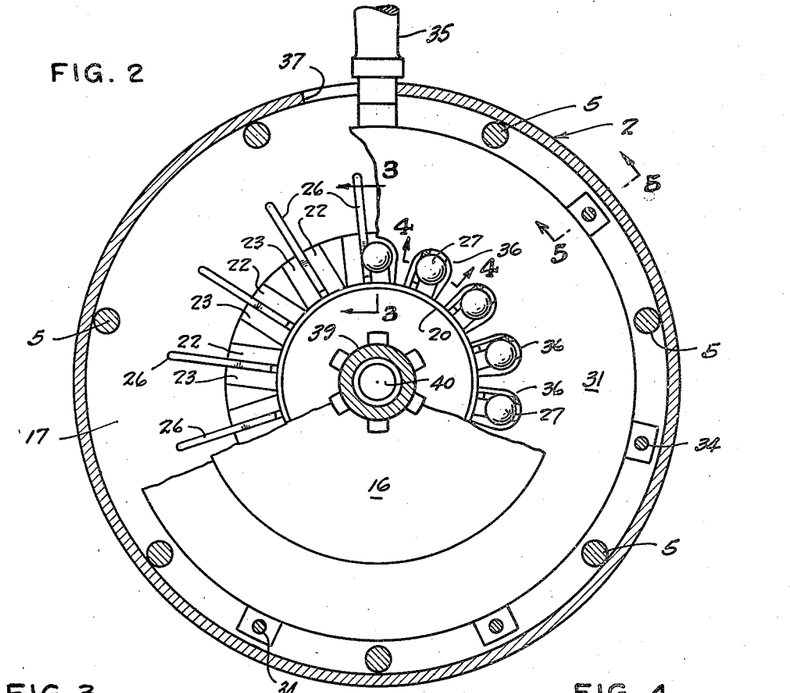
Fig. 2 is a cross-sectional view on an enlarged scale taken along plane 2—2 of Fig. 1.

As shown most clearly in Fig. 2, the balls 27 are arranged in an annular band around the axis of shaft 1 and are quite closely spaced in an angular direction. Thus as disc 16 is given its planetary motion by appropriate means to be hereinafter described, the localized area of driving contact imparting angular rotation of disc 16 about its own axis changes from one ball 27 to the next.

Figure 3:
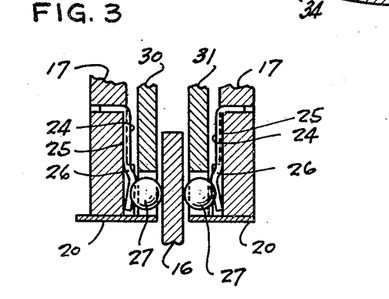
Figs. 3, 4 and 5 are detail sectional views taken along correspondingly numbered planes of Fig. 2.
Figure 4:
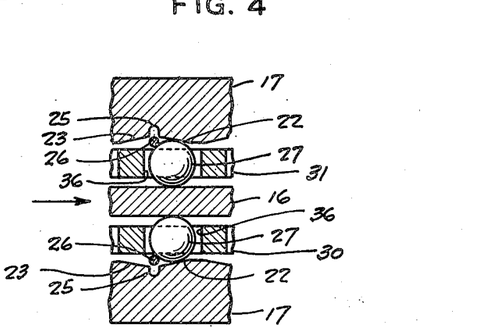

The manner in which the wedging spaces for the balls 27 are provided will now be described. In this connection Figs. 2, 3 and 4 show this construction most clearly. On those sides of the stationary members 17, which are adjacent the disc 16 there are provided a series of pockets, formed in a slightly raised face of the members 17. The number of these pockets correspond with the number of the balls 27. Each of the pockets is formed by sloping sides 22 and 23. These sloping sides form a deep central portion for the pocket and two wedging spaces on each side of the central portion. Let it be assumed for example, that disc 16 is being moved in a clockwise direction by its planetary motion as represented by the arrow at the left of Fig. 4. For that direction of rotation, and when the balls 27 are positioned as shown in that figure, it is seen that these balls become wedged in the converging spaces formed by the sides of disc 16 and the sides 22 of the pockets. Accordingly, for this position, the disc 16 will be rstrained at the area of contact between the balls 27 and the disc 16. The result is a counterclockwise rotation of disc 16 about its own shaft 39.

The direction of the pockets 22—23 is such as to be substantially tangential to the circle about which the balls 27 and the pockets 22—23 are arranged. Also as shown most clearly in Fig. 1, the disc 16 even for its maximum possible eccentricity would still be in contact with all of the balls 27, although only a limited number actually restrain the motion of the disc. The manner in which the balls act to provide successive driving contact points will be hereinafter described.

Means are provided for simultaneously moving all of these balls so that they are all in wedging relation with the corresponding surface 22 or surfaces 23 of the pockets.

Figure 5:
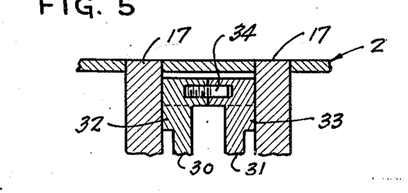

The mechanism for obtaining this result includes a pair of shift members 30 and 31. These members 30 and 31 are accommodated in the space formed between the stationary members 17 and are generally circular in shape. They may be dowelled together as by the aid of several pins 34 (Figs. 2 and 5), arranged in contacting bosses on these members. These members 30, 31 also have side flanges 32—33 in sliding contact respectively with the inner surfaces of stationary members 17. They are guided for angular motion about the axis of driving shaft 1 as by the aid of hollow tubes 20 which are pressed or otherwise held in central apertures formed in the members 17. Thus each of the members 30 and 31 is provided with a central bore fitting over the corresponding tube 20. Leading from the central bore are a number of radial slots 36. The number of these radial slots corresponds with the number of balls 27; and the balls are accommodated in these slots with considerable clearance. It is apparent that when the shift members 30 and 31 are angularly adjusted about the axis of shaft 1, the balls 27 will be given a corresponding angular motion due to contact with the sides of slots 36, so as to shift them from one side of the corresponding pockets to the other. Thereby a change in the wedging direction is obtained.

This angular shifting of members 30 and 31 can be provided by the aid of a radial handle 35, having an inner threaded portion engaging one or the other of the two members 30—31. A slot 37 can be provided in the cylindrical casing 2 which houses the mechanism. The angular extent of the slot 37 cooperates with the shank extending from handle 35 to limit the throw of the shift members 30 and 31.

Furthermore, the arrangement is such that the balls 27 are yieldingly held in one or the other side of the corresponding pockets 22—23. For this purpose each pocket is provided with a spring arm 26 located immediately above the deepest portion of the pocket. This spring arm is supported as by the aid of a shank 24 lying in groove 25 in the pocket and having a right angular extension fitting into an aperture in the corresponding stationary member 17. The spring arm 26 projects into the path of the ball 27. As the shift arm 35 is rocked, the ball 27 snaps either to one side or the other of the spring arm 26 which is momentarily depressed during this shifting operation. It is thus seen that after the shift arm 35 is operated, all of the balls 27 are held against accidental dislodgment from the desired wedging position.

All of the balls 27 are thus retained consistently in wedging position for either a clockwise or a counterclockwise motion along the circumference of the circle joining the centers of balls 27. It is also to be observed that since there are two sets of balls 27 on opposite sides of the disc or plate 16, the thrust occasioned by the wedging action on disc 16 is neutralized and there is no unbalanced force tending to move the shaft 39 in an axial direction.

Figure 12:
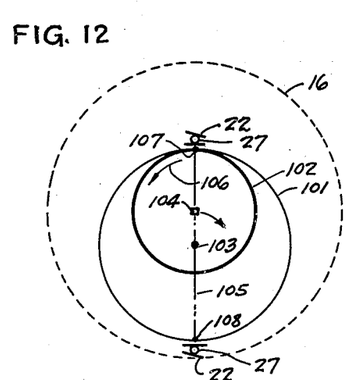

The operation of the device can be best explained in connection with Figs. 12, 12a, 13 and 13a. In Fig. 12, the disc member 16 has its outside periphery indicated by dotted lines. The light line circle 101 corresponds to the circle passing through the centers of the pockets 22—23. The axis of the driving shaft 1 is indicated by the small circle 103; and the axis of disc 16 is indicated by the small square 104. It is assumed that in the position of Fig. 12 the balls 27 wedge for clockwise direction of motion along the circumference of circle 101. This condition is indicated by the position of the line 22 representing the corresponding slanting surface of pocket 22—23. It is also assumed that the disc 16 is given a planetary motion in a clockwise direction as indicated by the arrow associated with the axis 104.

Although the diameter of disc 16 is that indicated by the dotted line, the effective diameter of the planetary wheel is that indicated by the heavy line 102 which is tangent internally of the circle 101 of the pockets 22—23. This can be realized immediately when it is appreciated that planetary driving contact can only occur at the circle 101, and the relative spacing of centers 103 and 104 determines the radius of circle 102. If R is the radius of circle 101, and r the radius of circle 102, the distance between the centers, as well as these radii fulfill the condition that the constant value R must equal the sum of the two variables r and the distance between the centers 103 and 104. The center 104 of disc 16 in the instantaneous position of Fig. 12 as in all the other diagrams, is represented as vertically above the center 103 of the stationary members 17.

The planetary circle of contact 102 moves as a unit toward the right as viewed in Fig. 12. This is due to the planetary motion of disc 16 in a clockwise direction. Accordingly, the surface of disc 16 wedges ball 27 in the top pocket, which pocket corresponds in location to the point 107, at the extremity of the diameter 105 passing through points 103 and 104. The ball 27 corresponding in position to the point 108 at the lower extremity of diameter 105 is not wedged by this action, because disc 16, moving toward the right, tends to move ball 27 out of its pocket. Accordingly, the disc 16 is confined at an area neighboring the point of tangency 107 between circles 101 and 102; disc 16 is not confined by any other of the balls. This is due to the fact that the balls which grip the disc 16 most strongly at any instant are those which correspond closest in space to the intersection 107 of the line 105 with the circle 101, where the direction of disc motion is most nearly in line with the wedging direction. These wedging balls at these areas, one on each side of disc 16, are diagrammatically represented by the top ball 27 of Fig. 12. This point of contact thus serves as a stationary fulcrum about which the circle 102 must roll, and the direction of that rotation is counterclockwise, as indicated by the arcuate arrow 106.

Although balls neighboring the ball 27 at the top of Fig. 12 may grip the disc 16, yet this gripping action is less strong than the gripping action of the ball 27 nearest the upper extremity 107 of line 105. This is true because the motion of the disc 16 at any other point near this common point of tangency 107 is diagonal or transverse to the direction of the pockets 22—23. This direction of motion does not become alined with the direction of the pocket until the point 108 is reached at the lower extremity of line 108. At this position 108 the direction of motion is such as to release the ball 27 and not to wedge it.

In other words, although disc 16 is in contact with all of the balls 27 at all times, yet one only (in each of the two annular sets of balls) corresponding in space closest to the point 107, serves as a fulcrum restraining motion of translation of disc 16. Accordingly, disc 16 is rotated in a counterclockwise direction about the axis 104. Point 107 thus serves as a rolling point of contact, as in ordinary planetary gears. Of course as the planetary motion proceeds, the line 105 moves in a clockwise direction about center 103, the balls 27 are in succession placed in the wedging position. The ultimate result is as if a planetary wheel 102 were rolling on an inner periphery of stationary wheel 101.

Figures 1, 8:
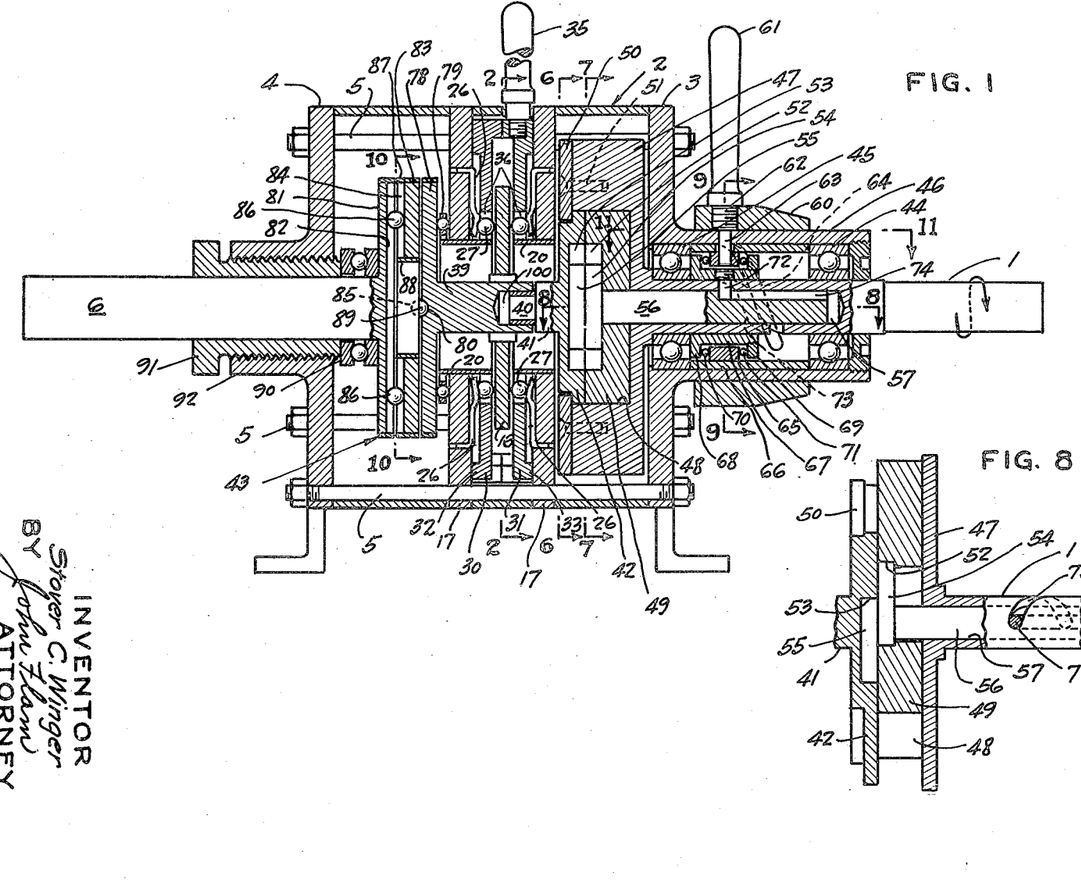
Figure 1 is a vertical sectional view of a transmission incorporating the transmission, the setting being such that the speed ratio is infinity.
Figs. 6, 7, 8, 9, 10 and 11 are detail sectional views taken along correspondingly numbered planes of Fig. 1.

It can readily be demonstrated that the number of revolutions of planetary wheel 102 for each revolution of the axis 104 about axis 103 is equal to $$\frac{R-r}{r}$$

where R is the radius of circle 101 and r is the radius of circle 102. It is thus seen that the greater the eccentricity, causing a reduction in the radius r, the faster the disc 16 will rotate in a counterclockwise direction. This provides an adjustable speed by varying the spacing of the two axes 103 and 104. When axis 104 is made concentric with axis 103 as represented in Fig. 1, the speed reduces to zero. This is also apparent from the formula given hereinbefore where the numerator of the formula reduces to zero, when the two radii R and r are equal.

The direction of rotation imparted to shaft 39 in this mechanism depends solely upon the position of the balls 27 in their pockets. Thus upon reversal of the rotation of drive shaft 1, the direction of rotation of disc 16 remains the same; however, the speed ratio is different.

This action is illustrated in Fig. 12a. In this case the axis 104 of the disc 16 is revolved in a counterclockwise direction. The ball 27 corresponding in position to the lower point 108 is now in wedging position, since the disc 16 is moving toward the left. The ball 27 corresponding in position closest to the point 107 is free. The effect is that the point 108 now forms a fixed fulcrum since it corresponds to the wedging ball. The result again is a rolling of a circle 109 on circle 101. This circle 109, it is seen, is larger in diameter than the stationary circle 101; but since side contact only is provided for, between the two wheels in planetary relation, this increase in size of the planetary wheel is not interfered with, although the rolling occurs on the concave side of the equivalent circle 101. The resultant direction of rotation about axis 104 is represented by the arcuate arrow 110 which is again counterclockwise.

Figure 13:
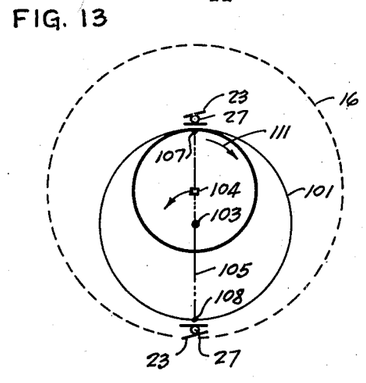

In Fig. 13, there is illustrated the condition where the wedging direction of ball 27 is reversed. In this case the top ball 27 now wedges toward the left, and the bottom ball 27, adjacent point 108, wedges toward the right. Thus if disc 16 is given a planetary motion in a counterclockwise direction as illustrated by the arrow associated with the axis 104, the point 107 acts as a fulcrum point and rotation of disc 16 is in the direction indicated by the arrow 111. This direction is clockwise.

The direction of rotation of disc 16 is again unaltered although the direction of the revolution of axis 104 be reversed. This is illustrated in Fig. 13a, where the planetary motion now takes place in a clockwise direction. In this case the fulcrum point is at 108 and rolling of discs 16 remains in the clockwise direction but at a reduced ratio.

With this preliminary explanation of the mode of operation of the device, a more detailed description of various elements in the mechanism can now be set forth.

It is of course understood that the drive shaft 1 can be connected to any appropriate source of motion, such as a motor or engine. The main portions of the mechanism are enclosed in a casing or housing of general cylindrical form. This housing can be in sections and end plates 3 and 4 may be provided. These end plates have integrally supporting feet. Tie-bolts 5 serve to hold the end plates and the housing 2 in assembled position. These bolts, as shown most clearly in Figs. 1 and 2, pass through the stationary members 17 and outside of the circumference of the shift members 30—31. It is apparent that the bolts 5 thus serve accurately to center the members 17 with respect to the axis of shaft 1. The shaft 6 represents the take-off shaft and is shown as coaxial with shaft 1.

The mechanism whereby a planetary motion is imparted to disc 16 will now be described. The drive shaft 1 is rotatably supported in any preferred manner as by ball bearings 44 and 45 secured in the hub 46 shown in this instance as integral with the end plate 3. As indicated in Fig. 1, this drive shaft 1 projects outside of the mechanism for ready connection to a source of motion. The inner end of the shaft is enclosed within the housing 2 and is provided with a cylindrical head 47 integral with the shaft. This head is shown to best advantage in Figs. 1, 6, 7 and 8.

Stub shaft 41, supporting disc 16, is shown as integral with a slide 42, slidable in a wide transverse slot 48 in the head 47. This slide can be adjusted so as to vary the spacing of shaft 41 with respect to shaft 1. In slot 48 is also slidably mounted a counterweight 49. These members 42 and 49 are in side contact as shown most clearly in Fig. 8, and are retained in the slot 48 as by the aid of the plates 50, which are secured to head 47 as by screws 51. It is apparent that members 42 and 49 are independently slidable in the transverse slot 48.

Figure 6:
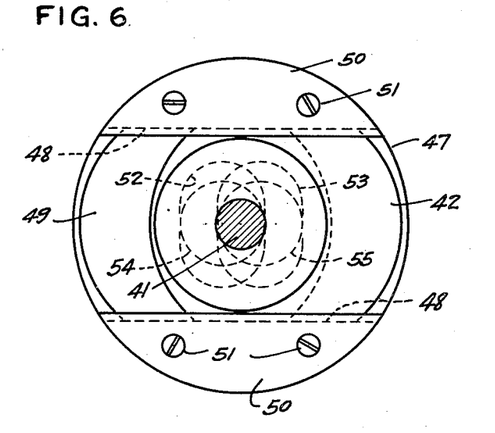
Figure 7:
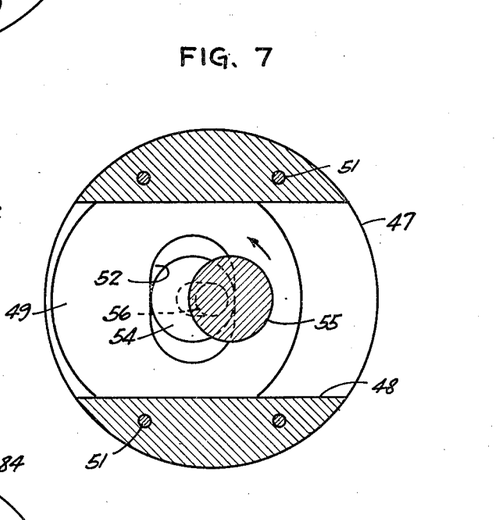
Figure 9:
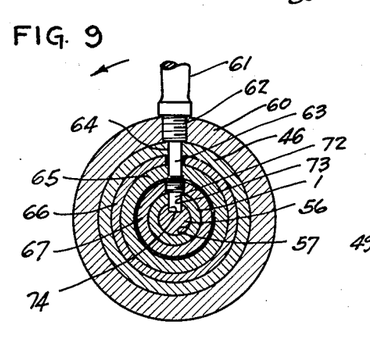

The mechanism whereby the counterweight 49 and slide 42 are moved transversely of the slot 48 in opposite directions includes cams or eccentrics 54 and 55 (Figs. 6, 7 and 8). These eccentrics are axially displaced and operate respectively in slots 52 and 53 cut respectively in counterweight 49 and member 42, and having longitudinal axes transverse to the slot 48. The centers of eccentrics 54 and 55 are arranged 180° apart. A shaft 56, which carries the eccentrics 54, 55, is shown as coaxial with shaft 1, and rotatably accommodated in a bore 57 in the inner end of drive shaft 1.

The sides of slots 52 and 53 engage the periphery of the corresponding eccentrics 54 and 55. Therefore if shaft 56 be rotated with respect to shaft 1 from the position shown in the drawings, plate 42 with its stub shaft 41 will move to the left as viewed in Fig. 6; and correspondingly then counterweight 49 will move to the right as viewed in Figs. 6 and 7. Since stub shaft 41 carries the projection 40 upon which the shaft 39 is supported, it is apparent that the relative angular position of shaft 56 with relation to shaft 1 determines the distance between the axes of disc 16 and of stationary members 17. This in turn determines the effective diameter of the planetary wheel 102 illustrated in Fig. 12.

The relative angular position of shafts 1 and 56 is adjusted by the aid of the mechanism illustrated most clearly in Figs. 1, 8, 9 and 11. Shaft 1 has a slot 73 therein, and shaft 56 has a slot 74 therein. These two slots are non-parallel. For example, slot 74 can be parallel to the axis of the shafts, and slot 73 can be helical with respect thereto. In order to adjust the angular positions of the shafts 1 and 56, use is made of a pin 72 which projects through slot 73 and into slot 74. Due to the fact that the slots 73 and 74 are divergent, and since pin 72 must always correspond to their point of intersection, it is apparent that by moving pin 72 in an axial direction, the point of intersection is varied, and the angular position of the two shafts is correspondingly varied.

Movement of pin 72 in an axial direction is accomplished by a shift collar 67 which is slidable on shaft 1, and within the hub 46. This shift collar carries the inwardly directed pin 72, by the aid of which it is rotated with shaft 1. In order to shift the collar 67, use is made of a ring 65 disposed between the flanges 68 and 69 of the collar 67. In order to permit collar 67 to rotate freely with the shaft 1, ball thrust bearings 70 and 71 can be disposed between the ring 65 and the flanges 68—69. Axial movement of the ring 65 thus causes axial movement of the shift collar 67.

This axial movement of ring 65 is provided by the aid of a handle 61. This handle is attached, as by the aid of a threaded portion, to an adjustable collar 60 on hub 46. The handle 61 carries the pin projection 63 which extends through a transverse slot 64, which may be in the form of a helix, cut in hub 46 and engaging in the ring 65. The pin 63 also passes through a corresponding slot in the spacer sleeve 66 within the hub 46.

It is evident that when handle 61 moves collar 60 with respect to the groove 64, the shift member 67 will be moved in an axial direction. This in turn will cause a variation in the relative angular position of shafts 1 and 56. The relative angular position of shaft 56 determines the radial positions of eccentrics 53 and 54 and thereby the radial position of stub shaft 41 and counterweight 49.

Figure 10:
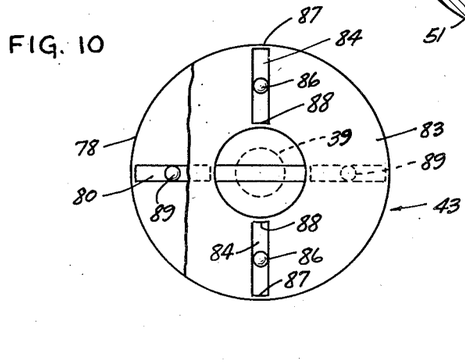
Figure 11:
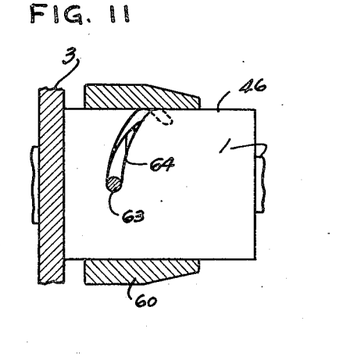

The mechanism for translating the rotation of disc 16 about its own axis to rotation of shaft 6 will now be described. This mechanism is designated generally by the reference character 43 and it is most clearly shown in Figs. 1 and 10.

Shaft 39 carries an integral circular plate 78. Ball thrust bearing 79 is interposed between this plate 78 and the adjacent stationary member 17. A groove 80 of substantially semi-circular section, extends across the end surface of the plate 78. A similar plate 81 is shown as formed integrally with shaft 6 and in juxtaposition to plate 78. This plate also has a groove 82 of substantially semi-circular cross section, on its inner face.

Interposed between the two plates 78 and 81 is a third or coupling plate 83. It is provided on its opposite faces with grooves 84 and 85 respectively. The grooves 84 and 85 are transverse to each other; in the present instance they are shown as being perpendicular to each other. The grooves are definitely limited in radial extent on the intermediate plate 83 as by the abutments 87 and 88. Corresponding overhanging abutments are also provided at the extremities of the grooves 80 and 82.

Coupling the intermediate plate 83 to both plates 78 and 81 are a plurality of balls 86 and 89. Balls 86 are located in grooves 84 and 82; and balls 89 are located in grooves 80 and 85. These balls 86 and 89 form virtually rolling keying members between the planetary mechanism and the shaft 6.

As shaft 39 rotates about an axis spaced from the axis of shaft 6, the intermediate plate 83 is constrained by balls 89 to adjust itself continuously (by movement along the axis of grooves 82 and 84) to keep grooves 80 and 85 in linear alinement. The effect is similar to that of a universal joint. Of course the maximum eccentricity between the axes is represented by the length of a radial groove, which is always less than the length of the radius of plate 83. The action is most clearly illustrated in the diagram of Fig. 14. In this figure, the heavy circle 81 represents the plate 81 attached to the driven shaft 6; the light circle 78 represents plate 78 attached to shaft 39; and the dotted circle 83 represents the intermediate plate 83 interposed between the other two plates.

Figure 14:
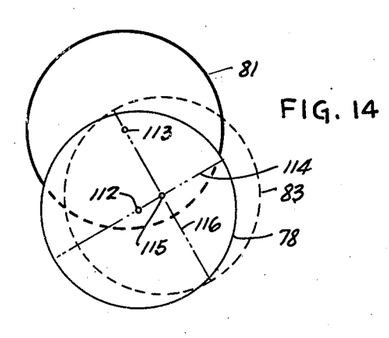
Fig. 14 is a diagram illustrating the mode of operation of the driving connection to the driven shaft.

Assume that the plate 78 is in an eccentric position with respect to plate 81, and that its axis 112 is revolving about axis 113 of plate 81, and that for the instant shown, grooves 80 and 85 occupy a position indicated by line 114. The center 115 of intermediate disc 83 must fall somewhere on line 114, due to its constraint by virtue of the grooves. Its center 115 must also pass through the axis 113 due to the constraint of grooves 82 and 84. Accordingly, this center 115 can be located by drawing a line 116 perpendicular to line 114 and passing through the center 113. This line 116 accordingly corresponds in direction to grooves 82 and 84, which are always perpendicular or transverse to grooves 80 and 85, represented by line 114.

It is apparent that rotation of plate 78 will cause a corresponding rotation of plate 81 due to the driving connections along lines 114, 116; and that this driving connection holds for any relative positions of axes 112 and 113. Although in the present instance but one ball is shown in each radial portion of the grooves 84 and 85, it is apparent that several balls might be used.

A ball thrust bearing 90 can be interposed between the left hand face of plate 81 and a threaded bushing 91 that is mounted in the hub 92 of the end plate 4. This bushing 91 serves to maintain the plates 78, 81 and 83 against axial separation.

It is apparent from a consideration of Figs. 12, 12a, 13 and 13a, that an overriding clutch effect is also provided by the mechanism. Thus in Fig. 12 if rotation of the wheel 102 occurs in a counterclockwise direction faster than it is driven in that direction, the wedging ball 27 adjacent the point 107 will not prevent such rotation. It is also apparent that as disc 16 is given its planetary motion, the balls 27 come successively into action and successively drop out of action. For smooth driving effects, it is of course advisable that there be a sufficiently close angular spacing between these balls.

I claim:

1. In a device of the character described, a pair of members having respectively parallel, spaced axes, one of the axes being revoluble with respect to the other, said members being spaced in an axial direction, and means forming a driving connection between adjacent axially spaced sides of the members for revolving said one axis, the areas of contact between said means and at least one of said members being on planes that are substantially perpendicular to the axes.

2. In a device of the character described, a pair of members, one of said members having a pair of sections respectively disposed on opposite sides of the other member, means forming a driving connection between adjacent axially spaced sides, said sections being arranged, during operation, to exert equal and opposite thrusts on the intermediate members, said members having parallel axes, means for varying the spacing between the parallel axes, and means for optionally releasing and reestablishing said driving connection.

3. In a device of the character described, a pair of members having respectively parallel, spaced axes, one of the axes being revoluble with respect to the other, said members being spaced in an axial direction, and means forming a driving connection between adjacent axially spaced sides of the members for revolving said one axis, the areas of contact between said means and at least one of said members being on planes that are substantially perpendicular to the axes, and means for varying the spacing between the axes.

4. In a device of the character described, a pair of members having respectively parallel spaced axes, one of the axes being revoluble with respect to the other, said members being spaced in an axial direction, means forming a driving connection between adjacent axially spaced sides, the areas of contact between said means and at least one of said members being on planes that are substantially perpendicular to the axes, and means for varying the spacing between the axes.

5. In a power transmission device, a pair of members having respectively parallel spaced axes, one of the axes being revoluble with respect to the other, means for placing the two members into planetary driving relation to each other, said means comprising one-way drive members so that the driven member can move in the driving direction with respect to the driving member, and means for selecting the direction of drive.

6. In a power transmission device, a pair of members having spaced parallel axes, as well as adjacent side surfaces, one of the axes being revoluble with respect to the other, and means forming a one-way drive between the members, including one or more roller members interposed between the surfaces.

7. In a power transmission device, a pair of members having spaced parallel axes, as well as adjacent side surfaces, one of the axes being revoluble with respect to the other, means for varying the spacing between the axes, and means forming a one-way drive between the members, including one or more roller members interposed between the surfaces.

8. In a power transmission device, a pair of members having spaced parallel axes, as well as adjacent side surfaces, one of the axes being revoluble with respect to the other, and means forming a one-way drive between the members, including one or more roller members interposed between the surfaces, and means for optionally varying the direction of the drive and for disconnecting the drive.

9. The combination as set forth in claim 8, in which the means for optionally varying the direction of the drive and for disconnecting the drive, comprises a shift member for moving the rolling members either to neutral or to engaging position with respect to the members.

10. In a device of the character described, a plate, a member disposed on one side of the plate and having a series of pockets with oppositely slanting surfaces to form in conjunction with the side of the plate, wedging spaces in both directions from the deep part of the pocket, a rolling wedge member in each pocket, means for shifting the wedge members optionally to the deep part of the pocket so as to be out of wedging relationship, or to either side of the pocket, and means providing relative motion between said plate and member.

11. In a device of the character described, a plate, a member disposed on one side of the plate and having an axis as well as a series of surfaces forming wedging spaces with the side surface of the plate, rolling wedge members in said spaces, and means for moving said plate in an orbital path with respect to said axis.

12. In a device of the character described, a plate, a member disposed on one side of the plate and having an axis as well as a series of pockets with oppositely slanting surfaces to form in conjunction with the side of the plate, wedging spaces in both directions from the deep part of the pocket, a rolling wedge member in each pocket, means for shifting the wedge members optionally to the deep part of the pocket so as to be out of wedging relationship, or to either side of the pocket, and means for moving said plate in an orbital path with respect to said axis.

13. In a device of the character described, a plate member, a cooperating member, said members having parallel, spaced axes, and arranged side by side, said cooperating member having a series of surfaces forming a series of wedging spaces with the side surface of the plate member, said wedging spaces being angularly disposed about the axis of the cooperating member, a rolling wedge member in each space, and means for moving one of the axes in an orbital path about the other axis.

14. In a device of the character described, a plate member, a cooperating member, said members having parallel, spaced axes, and arranged side by side, said cooperating member having a series of pockets with oppositely slanting surfaces to form in conjunction with the side of the plate member, wedging spaces in both directions from the deep part of the pocket, said pockets being angularly disposed about the axis of the cooperating member, a rolling wedge member in each pocket, means for shifting the wedge members optionally to the deep part of the pocket so as to be out of wedging relationship, or to either side of the pocket, and means for moving one of the axes in an orbital path about the other axis.

15. In a device of the character described, a plate member, a cooperating member, said members having parallel, spaced axes, and arranged side by side, said cooperating member having a series of pockets with oppositely slanting surfaces to form in conjunction with the side of the plate member, wedging spaces in both directions from the deep part of the pocket, said pockets being angularly disposed about the axis of the cooperating member, a rolling wedge member in each pocket, means for shifting the wedge members optionally to the deep part of the pocket so as to be out of wedging relationship, or to either side of the pocket, means for moving one of the axes in an orbital path about the other axes, and means for varying the distance between the axes.

16. In a device of the character described, a stationary member, a plurality of rolling elements annularly arranged in pockets in the side surface of said member, and forming a closely spaced series, a member having a free axis of rotation parallel to the center about which the pockets are arranged, means for imparting an orbital motion to said axis, each of said pockets having sides converging inwardly to form for the corresponding rolling element, a pair of wedging spaces, a spring barrier in the deep part of each pocket for yieldingly holding the corresponding rolling element in one or the other of the wedging spaces, and a shift device having projections entering between the rolling elements and angularly shiftable optionally to move all of the rolling elements simultaneously into either wedging space.

17. In a device of the character described, a pair of members having respectively parallel, spaced axes, one of the axes being revoluble with respect to the other, said members being spaced in an axial direction, and means providing a driving conection between adjacent axially spaced sides of the members for revolving said one axis, and means for varying the spacing between the axes.

18. In a device of the character described, a pair of members having respectively parallel, spaced axes, one of the axes being revoluble with respect to the other, said members being spaced in an axial direction, and means providing a driving connection between adjacent axially spaced sides of the members for revolving said one axis, and means whereby driving connection is maintained only on a restricted surface.

19. The combination as set forth in claim 18, in which the means for maintaining driving connection only on a restricted surface, comprises a series of annularly spaced wedging rolling elements, disposed between the members, said series being spaced so closely so that as the revolving motion progresses, the surface of driving connection progresses in a corresponding manner by shifting from one set of rolling elements to the next set.

20. In a device of the character described, a pair of members respectively having axes that are maintained parallel and sides that are axially spaced, means for adjusting the spacing of the axes, and means forming a driving connection between adjacent axially spaced sides of the members, comprising a plurality of rolling elements interposed between the members, one of said members having grooves for the accommodation of the rolling elements, said grooves having radial extensions to permit the elements to move radially toward and from the axis of said member, said grooves also having a wedging surface to cause the rolling element to be placed in operative relation to both said members.

21. A power transmission device having an axis, a pair of rotatable members, one of said members being rotatable about said axis, the other of said members being rotatable about an axis substantially parallel with the first mentioned axis and offset with respect thereto, and rolling means contacting and coupling said members, said axes both being on the same side of the points of engagement between said rolling means and the members, the said points of engagement serving to define a circle on each of said members with respect to that member's axis, said circles being of different diameters, characterized by the provision of means for so varying the relative positions of said axes that the diameter of one of said circles varies from less than the diameter of the other circle to greater than the diameter of the other circle.

STOVER C. WINGER.